United States Patent [19]
Heckel

[11] Patent Number: 6,036,601
[45] Date of Patent: Mar. 14, 2000

[54] METHOD FOR ADVERTISING OVER A COMPUTER NETWORK UTILIZING VIRTUAL ENVIRONMENTS OF GAMES

[75] Inventor: William Heckel, Pittsburgh, Pa.

[73] Assignee: Adaboy, Inc., Pittsburgh, Pa.

[21] Appl. No.: 09/256,827

[22] Filed: Feb. 24, 1999

[51] Int. Cl.[7] .............................. A63F 3/00; G09F 23/14
[52] U.S. Cl. .............................. 463/42; 463/30; 273/461; 705/14; 705/27
[58] Field of Search .............................. 463/1, 30, 40–42; 273/459–461, 236–237, 256; 700/91; 340/825, 825.22, 825.29, 825.3, 825.31, 825.33, 825.34, 825.35, 323 R; 380/9–10, 23–26; 705/14, 26–27; 902/1, 2

[56] References Cited

U.S. PATENT DOCUMENTS

| | | | |
|---|---|---|---|
| 4,902,020 | 2/1990 | Anxier | 273/256 |
| 5,009,429 | 4/1991 | Anxier | 273/256 |
| 5,227,874 | 7/1993 | Von Kohorn | 358/84 |
| 5,504,675 | 4/1996 | Cragun et al. | 364/401 |
| 5,643,088 | 7/1997 | Vaughn et al. | 463/40 |
| 5,724,424 | 3/1998 | Gifford | 380/24 |
| 5,823,879 | 10/1998 | Goldberg et al. | 463/42 |
| 5,941,772 | 8/1999 | Paige | 463/25 |

FOREIGN PATENT DOCUMENTS

| | | | |
|---|---|---|---|
| 2235325A | 2/1991 | United Kingdom | 273/237 |

OTHER PUBLICATIONS

Ward, David, "Games Brake for Commercials," Game Intelligence Magazine, Feb. 1999, p. 20.

*Primary Examiner*—Mark A. Sager
*Attorney, Agent, or Firm*—Kenneth P. McKay, Esq.

[57] ABSTRACT

A method is provided for advertising within the virtual environments of games. Default images of games are replaced by alternative textures having advertisements implemented therein. An ad server coordinates the matching of ads to demographic data of the game player and properly accommodates ads in formats from game information provided by game sources. The game player is visually influenced by advertisements as he or she views the virtual world of the game, as plug-in software replaces the default images with virtual pictures and figures utilizing an advertisement. View statistics are retrieved from the game player's computer or console to rate viewing effectiveness for ad placement confirmation and billing purposes.

17 Claims, 1 Drawing Sheet

METHOD FOR ADVERTISING OVER A COMPUTER NETWORK UTILIZING VIRTUAL ENVIRONMENTS OF GAMES

BACKGROUND OF THE INVENTION

1. Field of the Invention

The present invention is a method for advertising within virtual environments of games played over a network. Advertisements are used as plug-ins for 3D texture areas within an Internet game, as a non-interactive means of advertising, which is directed to a wide variety of players having a multitude of different demographic profiles.

2. Description of the Related Art

Use of the Internet as a global communications network has dramatically increased over the past decade. A wide variety of companies can market, advertise, and sell their respective products via the worldwide web. The advertising activity can receive effective and immediate responses because the many users are mindful of the many client software programs (i.e. web browsers) available. The Internet is extensively used for entertainment purposes as well, and repositories for playing games are one of the many services provided by the Internet Known in the art are methods for advertising over a network, and more notably, methods for combining automated casino-type games with real-time product advertising. See U.S. Pat. No. 5,823,879, Goldberg, et al. Information regarding goods or services are exchanged between users as they play games such as blackjack, craps, or roulette, etc. Exchanged advertising information is adapted to be shown to users who fit a general demographic profile. The game players may interactively respond to questionnaires or enticing product information.

Advertising is also simultaneously implemented in computer games that enable remote participants to respond to live broadcast sporting games described in U.S. Pat. No. 5,643,088, Vaughn et al. Interactive ad messages are transmitted and downloaded from a central computer system means and made available for immediate feedback by the network user following the game.

In conjunction with TV and radio advertisements, ads via the Internet are disruptive, and they are displeasing to a user not looking for such marketing ploys. Also, most advertisers wish to direct the ads towards specific viewers or listeners, but this becomes too difficult over such a vast network, and ads are unintentionally shown to a wide demographic. The wide variety of people using a global network such as the worldwide web makes it difficult for the advertiser to know which advertisement or location of the advertisement is most effective, and, in particular, there is no way of measuring an actual audience. Network game playing servers can match some demographic profiles to aim specific advertisements towards a select user, but the range of the profile is still lacking, as certain games themselves already attract a specific group. Internet game players and worldwide web users want to play interactively in the games, not further encumbered with the interruption of surveys and advertisements. Marketing companies can still, however, advertise effectively within games played over a network that would influence users of a larger demographic profile, while the game player is not disrupted from the game environment, and is not prompted or asked to focus his/her attention away from the featured game screen.

PRIOR ART

U.S. Pat. No. 5,643,088, Jul. 1, 1997 (Vaughn et al.), shows a game of skill or chance played simultaneously by several participants remote from each other also provides for interleaved interactive advertising. Communication means provide to each participant the common game along with interactive advertising.

U.S. Pat. No. 5,823,879, Oct. 20, 1998 (Goldberg et al.) teaches a game playing method and apparatus for automating games such as blackjack, poker, craps, roulette, baccarat and pai gow. The invention may also be used to play such games on the Internet or an interactive cable television network. During a game, advertising is selectively provided by comparing player personal information with a desired demographic profile.

U.S. Pat. No. 5,227,874, Jul. 13, 1993 (Von Kohorn) demonstrates the evaluation of stimuli such as broadcast commercials intended to promote purchases by shoppers are disclosed. The methods quantify the effectiveness of controlled variables of stimuli and of inducements associated therewith.

U.S. Pat. No. 5,724,424, Mar. 3, 1998 (Gifford) shows a complete system for the purchasing of goods or information over a computer network is presented. A network payment system performs payment order authorization in a network with untrusted switching, transmission, and host components.

U.S. Pat. No. 5,504,675, Apr. 2, 1996 (Cragun et al.) teaches a sales promotion program dynamically selected from a plurality of programs for presentation in a program presentation unit by a neural network. The collected data is provided to the neural network in any one of a plurality of training schemes typical for neural networks. The network can be retrained in response to sales data.

SUMMARY OF THE INVENTION

It is the objective of the present invention to provide a non-interactive method of advertising within game screen environments on the Internet, which does not interrupt the playing of the game, yet exposes the user to the advertisement. A variety of shapes and colors that make up patches of a game background are replaced by similar shape ad textures embedded in certain locations of the game. As a game character, or as the viewer himself, walks around or moves in some manner on the game screen or within the game environment, he or she views an advertisement in a location normally occupied by a similar shaped wall, picture, or machine, etc. A user playing a game, which he or she has linked to or downloaded from the Internet, controls the movement of a character as seen in the user's view or in third person. As the user views the surroundings and his or her movement, in conjunction with the character's motion within the game environment, a default graphic texture or figure is replaced by a plug-in, which advertises a product or service provided by an ad server. Within the virtual environment of the game, a character or player is visibly influenced by the advertisement and, at the same time, still actively taking part in the playing of the game. This reduces the distracting element of advertisements within the gaming environment.

It is a secondary objective of the present invention to direct advertising to network game players who fit varying demographic profiles. Many games are played via the Internet that users enjoy, which are directly related to age, sex, income group, etc. In the present method, advertisers would seek user information from a particular database on the game server provided to them from a game user login query. Coupling the variety of games made available over the worldwide web or other server with a particular user's demographic profile would be beneficial to companies or services wishing to direct advertising to particular groups of people matching a desired demographic range.

It is a third objective of the present invention to include statistical features for each advertisement displayed so the advertiser can rate its effectiveness. The number of times the ad is viewed, the time the ad is displayed on the screen, the game, and the viewer's demographic profile are all provided from the game user computer to the ad server. An advertiser relates directly to an ad server what his or her desired viewer profile and image features are, and in return, the ad server provides the feedback from the user's computer as an identifiable market effectiveness rating. The ad server compiles this information into a form suitable for billing the advertiser and conveying the statistical information to the advertiser.

DETAILED DESCRIPTION OF THE PREFERRED EMBODIMENT

Figure 1:
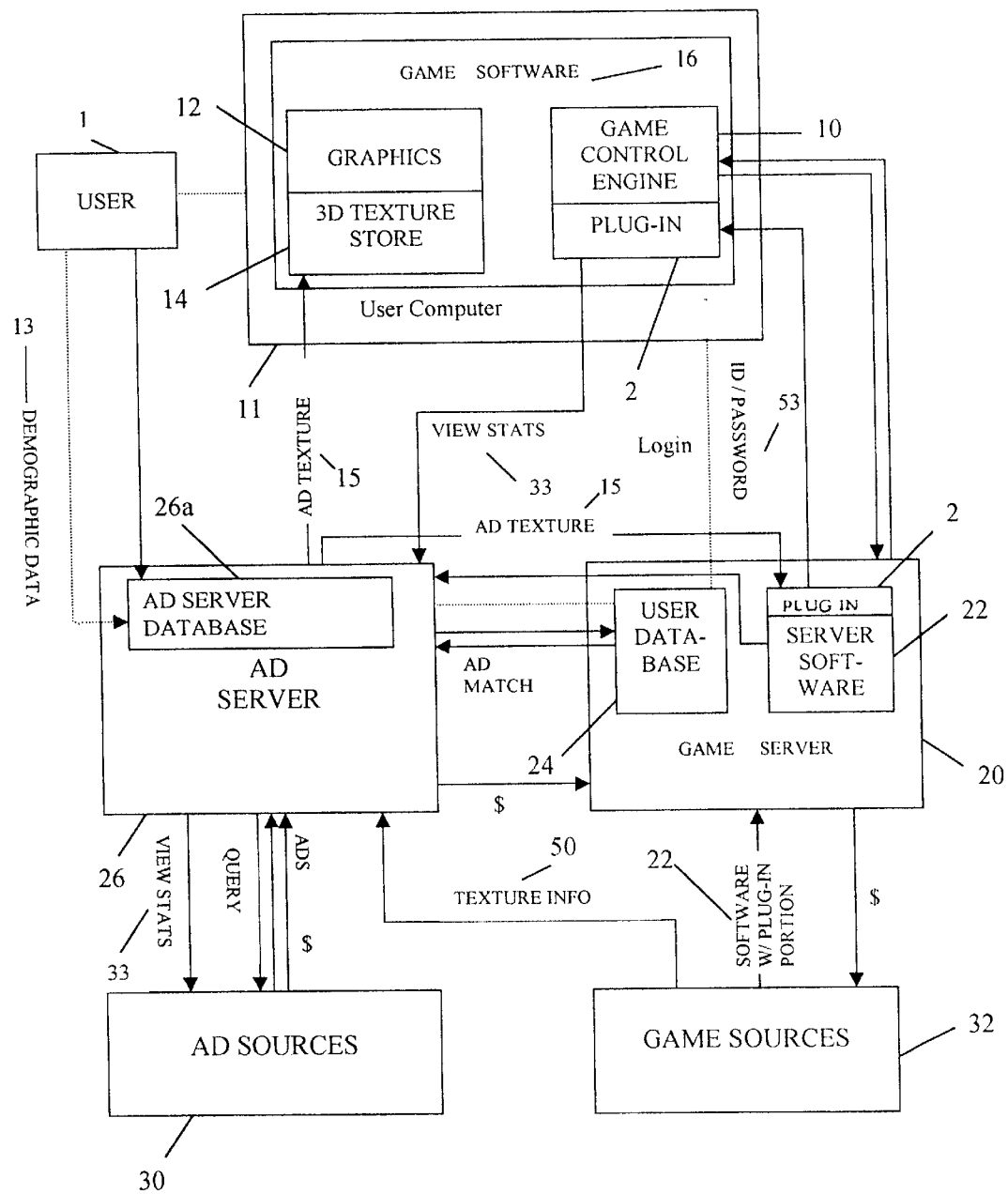
FIG. 1 is block diagram showing the relationship between each server and the flow path of the data sent or collected as an advertisement is implemented and a game player logs onto a network.

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated device, and such further applications of the principles of the invention illustrated herein as would normally occur to persons skilled in the art to which the invention relates.

Referring to FIG. 1, an ad server company, running a server, hereinafter referred to as ad server 26, provides the capability through an ad server 26 to dynamically download information from its ad server 26 to be used in a game at runtime. The ad server 26 also has the capability to contact and download information from a server alternative to a regular server to ease the load on any main server.

The ad server 26 contacts the game sources 32 and requests texture information 50 related to the games. The games may be standard strategic games; non-goal oriented games utilizing virtual reality platforms, or any online collaborative environment. The texture information 50 includes shapes wherein default textures are embedded. This texture information 50 is then sent to the ad server 26.

The ad server 26 requests from the game sources 32 that they provide 'hooks', or plug-in portions in their game software wherein plug-ins could be implemented. It is generally known that a plug-in is a small piece of software that can be loaded into memory of a larger software program.

The ad server 26 contacts advertising sources 30 and provides them with advertising formats corresponding to the shapes of the default textures in the texture information 50 provided by the game sources 32. The ad sources 30 then generate and provide the graphical ad images based on a query from the ad server 26. The ad server 26 can then correlate each ad image to an appropriate format to later load into the plug-in portion of the game server software 22. The ad server 26 also provides a description of the intended demographic profile 13 of the user 1 for the advertising, and any specific requirements for the viewing such as minimum age or sex. A demographic profile 13 of the user 1 can be retrieved from the user 1 or user computer 11 by query and stored in an ad server database 26a, or can be retrieved from a user database 24 by networking to login information. The demographic profile 13 may include a user's age group, sex, income, employment group, residence location, or ethnicity, etc. A specific rate for 'impressions' is agreed upon based on demographic impressions and the intended target audience.

The game server 20 is then loaded with the game server software 22. The game server 20, which is networked, or on a same system as the ad server 26, may share software with the ad server 26 and includes the capability to work in unison with the ad server 26, and will provide and extract ID 53 data between the user database 24 and the ad server 26. The game software 16 is downloaded by the user 1 from the game server software 22 at no charge, or sold at computer or vending stores for personal computer or free standing video game console installation.

A user database 24 is set up on the game server 20 to track the user's high scores and other game related information, as well as to provide a repository for demographic data 13 relevant to the needs of the ad server 26. The ad server 26 can query the user database 24 when presented with a particular information to extract the demographic data 13 corresponding to an ID 53 for the most effective advertising purposes.

An ad server database 26a in the ad server 26 may include all of the data from the user database 24 set up on the game server 20 to improve communication speed between the ad server 26 and the user computer 11 by eliminating the need to communicate between the game server 20 and ad server 26.

When a user 1 logs onto the game server 20 from his or her computer 11, he or she provides a user ID and preferably a password 53 to authenticate his or herself and allow for retrieval of the game and any demographic data 13. When the user 1 on the computer 11 chooses a game that is enabled by the present invention, the game software 16, now downloaded or installed and running on the computer 11, queries the ad server 26 with the user's ID, game identification, level of play etc. If the ad server 26 has a copy of the user's demographic data 13 in the ad server database 26a, it searches to locate appropriate advertising for the game and user from the advertising sources 30. Otherwise, the ad server 26 queries the user database 24 implemented in the game server 20 for the user's demographic data 13 and performs the ad matching. Upon choosing advertising appropriate for the game and user 1, the ad server 26 presents the information as ad textures 15 to the user's computer 11 for download into a local texture store 14, along with intended viewing profiles. After the ad textures 15 have been received from the ad server 26 and loaded into the local texture store 14, they are loaded as a plug-in 2 to the server software 22, which selects individual advertising material for presentation to the game player inside the virtual environment of the game.

Once all of the ad textures 15 are loaded and ready, and the user 1 and the game server 20 are ready, play will commence. During play of the game, the game control engine 10 of the computer 11 builds a graphical image out of an internal representation of the virtual space that the game occurs within. It then 'paints', or visually implements, the mathematical representation of the world with textures from the local texture store 14. The game's virtual space will have several locations, provided in the texture information 50, where the ad textures 15 received from the ad server 26 will be appropriate to display in lieu of the default game textures. These default textures include 3D or 2D models of shapes and figures, video clips, pictures and signs, or other non-interactive features. The plug-in 2 in the game software 16 selects an appropriate ad texture 15 for advertising, which replaces the default texture and presents the ad texture 15 for display in the graphics generations portion 12 of the game. The plug-in 2 of the game software 16, then being implemented by the user computer 11, also keeps track of the view statistics 33. These include the time each ad texture 15 is displayed, the number of ad textures 15 displayed, the size, in terms of pixels, each ad texture 15 occupies, and the type of views that the ad texture 15 is shown as. These view statistics 33 are logged for later download to the ad server 26. Between each level of play, while the game is waiting to synchronize with the game server 20, additional advertising textures 15 and information may be exchanged between the ad server 26 and the user computer 11 having the downloaded plug-in 2 available for advertising within the game. At the completion of the game, the user computer 11 sends score and other statistical information from the user's computer 11 to the game server 20. At this time, the plug-in portion 2 transmits the viewing statistics 33 gathered to the ad server 26. The ad server 26 will then transmit confirmation information to the game server 20 to insure credit for playing the advertising version of the game server software 22.

After the game has been played, the ad server 26 calculates the charges to the advertising sources 30 based on the user demographic profile 13 and the 'fit' (accuracy in the want or need of the advertising source 30) between the intended viewing audience and the actual viewing audience and the number of views or impressions delivered. The ad sources 30 are billed, and upon receipt of the money from the ad sources 30, the company of the game server 20 will be paid their portion of the revenue. They will then pass a portion of the revenue on to the game sources 32, insuring that a steady stream of new content is available for this medium.

I claim:

1. A method for providing advertising to a user having a computer, which participates within the virtual space of games played over a network, comprising the steps of:

(a) setting up an ad server having an ad server database;

(b) identifying a plurality of game sources that provide game server software to a game server so said user can play a game, said game server having a server ID and a user database, said user having a demographic profile and a user ID, said computer utilizing a graphics generator, a local texture store, and a game control engine, said game control engine controls said game after utilization of said game software and builds a graphical image out of an internal representation of said virtual space that said game occurs within and paints a mathematical representation of said virtual space with a plurality of default textures from said local texture store;

(c) requesting from each of said game sources texture information related to said game, comprising a plurality of on-screen virtual items wherein each of said default textures are embedded;

(d) receiving said texture information;

(e) requesting that each of said game sources provide a plurality of plug-in portions within said game server software adapted to receive a plurality of plug-ins, each of said plug-ins adapted to be images alternative to said plurality of default textures, and each of said plug-ins monitor a plurality of viewing statistics for said plurality of images alternative to said plurality of default textures;

(f) confirming that each of said game sources has provided said plurality of plug-in portions;

(g) identifying a plurality of ad sources that have the capability of providing a plurality of advertisements to said ad server, adapted to work in conjunction with said game server over said network, each of said advertisements directed to influence said user having said demographic profile, said demographic profile is retrieved from said user by said ad sources and transmitted to said ad server database and stored, and said demographic profile is transmitted from said computer to said user database by a login of said user onto said game server on said network with said user ID;

(h) providing to said ad sources a plurality of advertising formats corresponding to said plurality of on-screen items;

(i) receiving from said ad sources a plurality of advertising images;

(j) correlating each of said advertising images with each of said advertising formats, thereby forming a plurality of ad textures;

(k) matching each of said ad textures with said demographic profile;

(l) sending each of said ad textures to said local texture store;

(m) loading each of said ad textures to said plug-in portion of said game server software;

(n) loading said game server with said game server software, whereby said game server software can be utilized as game software by said user, thereby said game control engine builds said graphical image out of said internal representation of said virtual space that said game occurs within and paints said mathematical representation of said virtual space with each of said ad textures, thereby each of said ad textures are painted as said images alternative to each of said default textures, said game software works in conjunction with said game control engine, thereby said plurality of viewing statistics of said ad textures can be monitored by each of said plug-ins;

(o) receiving each of said viewing statistics from each of said plug-ins;

(p) transmitting to said game server, a means of confirmation that each of said ad textures were displayed based on receipt of said plurality of viewing statistics; and, (q) setting up a method for billing.

2. A method as claimed in claim 1, wherein said method for billing, further comprises the steps of:

(a) ensuring credit to said game server;

(b) calculating a plurality of charges to each of said advertising sources based on said demographic profile and said plurality of viewing statistics;

(c) billing each of said ad sources, whereby revenue is received;

(d) paying a portion of said revenue to said game server; and, (e) paying a portion of said revenue to each of said game sources.

3. A method as claimed in claim 1, wherein said network is the Internet.

4. A method as claimed in claim 1, wherein said game is a non-goal oriented game utilizing a virtual reality platform.

5. A method as claimed in claim 1, wherein said game is an online collaborative environment.

6. A method as claimed in claim 1, wherein said computer is a free standing video game console.

7. A method as claimed in claim 1, wherein said game server software is utilized by download.

8. A method as claimed in claim 1, wherein said game server software is utilized by installation.

9. A method as claimed in claim 1, wherein each of said ad textures is matched to a particular said demographic profile stored in said user database.

10. A method as claimed in claim 1, wherein each of said ad textures is matched to a particular said demographic profile stored in said ad server database.

11. A method as claimed in claim 1, wherein said demographic profile includes some of the following information related to said user: an age group, a sex, an income group, an employment group, a residence location, and an ethnicity.

12. A method as claimed in claim 1, wherein said user ID includes an identification number and a password.

13. A method as claimed in claim 1, wherein said ad server and said game server are on a same system.

14. A method as claimed in claim 1, wherein said plurality of on-screen virtual items includes three-dimensional virtual models.

15. A method as claimed in claim 1, wherein said plurality of on-screen virtual items includes two-dimensional virtual pictures.

16. A method as claimed in claim 1, wherein said plurality of viewing statistics include: an ad view count transmitted to said ad server showing a time each of said ad textures is displayed within said virtual space; a screen view display transmitted to said ad server showing the arrangement of how each of said ad textures is displayed within said virtual space; a pixel display transmitted to said ad server showing the total amount of pixels said ad texture occupies within said virtual space; a user name transmitted to said ad server showing who is playing said game; a game name transmitted to said ad server showing a name of said game being played by said user.

17. A method as claimed in claim 16, wherein a fit is described by a comparison made between said time each of said ad textures is displayed within said virtual space, and an intended viewing audience versus an actual viewing audience, said fit corresponds to an amount for said billing.

* * * * *